US012791044B2

(12) United States Patent
Kim

(10) Patent No.: US 12,791,044 B2
(45) Date of Patent: Nov. 10, 2026

(54) COIL ASSEMBLY AND ELECTRONIC CONTROL DEVICE COMPRISING THE SAME

(71) Applicant: HL MANDO CORPORATION, Gyeonggi-do (KR)

(72) Inventor: Minseong Kim, Sejong-si (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 716 days.

(21) Appl. No.: 18/228,683

(22) Filed: Aug. 1, 2023

(65) Prior Publication Data

US 2024/0060517 A1 Feb. 22, 2024

(30) Foreign Application Priority Data

Aug. 16, 2022 (KR) ........................ 10-2022-0101754

(51) Int. Cl.
*F15B 13/04* (2006.01)
*F15B 13/044* (2006.01)
(Continued)

(52) U.S. Cl.
CPC ........... *F15B 13/044* (2013.01); *H01F 7/081* (2013.01); *H01F 27/325* (2013.01)

(58) Field of Classification Search
CPC ....... F15B 13/044; H01F 7/081; H01F 27/325
See application file for complete search history.

(56) References Cited

U.S. PATENT DOCUMENTS 6,124,775 A * 9/2000 Linkner, Jr. ............ B60T 8/363 335/278
2004/0070302 A1* 4/2004 Parker ........................ H01F 5/04 310/194

(Continued)

FOREIGN PATENT DOCUMENTS

DE 10 2006 046 451 4/2007
DE 10 2016 201 003 7/2016

(Continued)

OTHER PUBLICATIONS

Office Action dated Apr. 13, 2026 for Korean Patent Application No. 10-2022-0101754 and its English translation provided by Applicant's foreign counsel.

(Continued)

*Primary Examiner* — Malcolm Barnes
(74) *Attorney, Agent, or Firm* — WOMBLE BOND DICKINSON (US) LLP

(57) ABSTRACT

A coil assembly and an electronic control device including the same are disclosed. The coil assembly according to an exemplary embodiment of the present disclosure includes a bobbin having a cylindrical body around which a coil is wound, an elastic part provided on one side of the body in the longitudinal direction, and a lead pin coupling part extending from the other side of the body in the longitudinal direction to the other side of the longitudinal direction; and a coil case having a cylindrical outer cover surrounding the outer peripheral surface of the body, a first end cover disposed at one end of the outer cover in the longitudinal direction so as to contact the elastic part and a second end cover protruding through the lead pin coupling part and disposed at the other end of the outer cover in the longitudinal direction, wherein the coil case may be pressed on one (Continued)

side of the longitudinal direction by elastically supporting the first end cover by the elastic part.

20 Claims, 6 Drawing Sheets

(51) Int. Cl.
*H01F 7/08* (2006.01)
*H01F 27/32* (2006.01)

(56) References Cited

U.S. PATENT DOCUMENTS

2007/0084439 A1* 4/2007 Isogai ..................... F16K 1/221
123/399
2016/0217912 A1* 7/2016 Yun ......................... H01F 7/126

FOREIGN PATENT DOCUMENTS

JP 2-24515 2/1990
JP 2-24515 U * 2/1990 ............... H01F 7/16
JP 4-103607 9/1992
KR 10-2015-0061318 6/2015
KR 20150061318 A * 6/2015 ................ B60T 8/17
KR 10-1536190 7/2015
KR 10-2016-0041637 4/2016
KR 20160041637 A * 4/2016 ............... H01F 5/02
KR 102157830 B1 * 9/2020 ............. F16K 47/00

OTHER PUBLICATIONS

Office Action dated Jun. 19, 2026 for German Patent Application No. 102023121692.9 and its English translation by Google Translate.

* cited by examiner

112 : 112a, 112b, 112c, 112d

COIL ASSEMBLY AND ELECTRONIC CONTROL DEVICE COMPRISING THE SAME

CROSS-REFERENCE TO RELATED APPLICATION

This application claims priority to and the benefit of Korean Patent Application No. 10-2022-0101754, filed on Aug. 16, 2022, the disclosure of which is incorporated herein by reference in its entirety.

BACKGROUND

1. Technical Field

The present disclosure relates to a coil assembly and an electronic control device, and more specifically to a coil assembly which is applicable to an electronic control device and an electronic control device including the same.

2. Discussion of Related Art

A solenoid valve is used in a brake electronic control unit of a vehicle, such as an anti-lock brake system (ABS), an electric control unit (ECU) or an electronic stability control system (ESC) ECU.

The solenoid valve includes a coil assembly which is disposed in a housing to form an electric field when a coil is wound and power is applied, and a valve assembly that opens and closes a flow path by the electric field formed in the coil assembly, that is, a hydraulic control unit (WU). In general, the coil assembly is installed on the circuit board of an ECU through lead pins, and the valve assembly may be press-fitted and installed in a hydraulic block.

The coil assembly includes a bobbin hick is wound around the coil and a coil case which is disposed to surround the bobbin. Considering the ease of fastening between the coil assembly and the valve assembly, the coil case does not completely come into close contact with the bobbin and has a flow. Meanwhile, it is advantageous in terms of magnetic force performance and heat dissipation that the coil case is in close contact with the hydraulic control unit after the valve assembly and the coil assembly are coupled.

In this regard, conventionally, an elastic structure such as a plate spring or a silicon ball has been separately installed in a housing in which a coil assembly is disposed such that the coil assembly is pressed toward the hydraulic control unit. However, since this method requires a separate elastic structure to be disposed in the housing in which the coil assembly is disposed, there are problems of increasing material cost, increasing assembly process and reducing space efficiency in the housing.

Korea Registered Patent No. 1536190 "SOLENOID VALVE FOR BRAKE SYSTEM"

SUMMARY

The present disclosure has been devised to solve the problems of the related art described above, and an object of the present disclosure is to provide a coil assembly in which a coil case of the coil assembly can be pressed to one side by elasticity provided from the inside, and an electronic control device including the same.

Another object of the present disclosure is to provide a coil assembly having a heat dissipation structure which is capable of efficiently discharging heat generated inside the coil assembly to the outside, and an electronic control device including the same.

The objects of the present disclosure are not limited to the above-described objects, and other objects that are not mentioned will be able to be clearly understood by those skilled in the art to which the present disclosure pertains from the following description.

According to an aspect of the present disclosure, provided is a coil assembly, including a bobbin having a cylindrical body around which a coil is wound, an elastic part which is provided on one side of the body in the longitudinal direction, and a lead pin coupling part which extends from the other side of the body in the longitudinal direction to the other side of the longitudinal direction; and a coil case having a cylindrical outer cover which surrounds the outer peripheral surface of the body, a first end cover which is disposed at one end of the outer cover in the longitudinal direction so as to contact the elastic part and a second end cover which protrudes through the lead pin coupling part and is disposed at the other end of the outer cover in the longitudinal direction, wherein the coil case is pressed on one side of the longitudinal direction by elastically supporting the first end cover by the elastic part.

In the coil assembly according to an exemplary embodiment of the present disclosure, the elastic part may be provided in plurality.

In the coil assembly according to an exemplary embodiment of the present disclosure, at least one of the plurality of elastic parts may be in contact with the first end cover in a range of 0 to 180 degrees along the circumferential direction from one side of the body of the bobbin in the longitudinal direction, and at least one of the remaining elastic parts may be in contact with the first end cover in a range of 180 to 360 degrees along the circumferential direction from one side of the body of the bobbin in the longitudinal direction.

In the coil assembly according to an exemplary embodiment of the present disclosure, at least one pair of elastic parts among the plurality of elastic parts may be disposed symmetrically with each other.

In the coil assembly according to an exemplary embodiment of the present disclosure, the pair of elastic parts may be in contact with the first end cover, respectively, at positions that are 180 degrees apart from each other along the circumferential direction on one side of the body of the bobbin in the longitudinal direction.

In the coil assembly according to an exemplary embodiment of the present disclosure, the elastic part may include a flange part which extends radially outward from one side of the body of the bobbin in the longitudinal direction; an incision part which is formed in the flange part; and an extension part which extends from one side of the incision part to the inside of the incision part.

In the coil assembly according to an exemplary embodiment of the present disclosure, the extension end of the extension part may be formed as a free end.

In the coil assembly according to an exemplary embodiment of the present disclosure, the extension end of the extension may be formed in an arc shape.

In the coil assembly according to an exemplary embodiment of the present disclosure, the incision part may be formed along a circumferential direction, and the extension part has a predetermined curvature.

In the coil assembly according to an exemplary embodiment of the present disclosure, the center of curvature of the extension part may be located on a central axis of the body of the bobbin in the longitudinal direction.

In the coil assembly according to an exemplary embodiment of the present disclosure, the distance between the edge of the incision part and the extension part may be formed to be constant.

In the coil assembly according to an exemplary embodiment of the present disclosure, the elastic part may further include a protrusion which protrudes from the outer surface of the extension part and contacts the first end cover.

In the coil assembly according to an exemplary embodiment of the present disclosure, at least a portion of the extension part may be bent toward the first end cover to contact the first end cover.

In the coil assembly according to an exemplary embodiment of the present disclosure, the extension end of the extension part may contact the first end cover.

In the coil assembly according to an exemplary embodiment of the present disclosure, the outer cover and the second end cover may be integrally provided, and the first end cover may be provided separately from the outer cover.

According to another aspect of the present disclosure, provided is an electronic control device, including a coil assembly; a hydraulic control block which is on one side of the coil assembly in the longitudinal direction; and a circuit board which is disposed to be spaced apart from the other side of the coil assembly in the longitudinal direction and electrically connected to the coil assembly by lead pins; wherein the coil assembly includes a bobbin having a cylindrical body around which a coil is wound, an elastic part which is provided on one side of the body in the longitudinal direction, and a lead pin coupling part which extends from the other side of the body in the longitudinal direction to the other side of the longitudinal direction; and a coil case having a cylindrical outer cover which surrounds the outer peripheral surface of the body, a first end cover which is disposed at one end of the outer cover in the longitudinal direction so as to contact the elastic part and a second end cover which protrudes through the lead pin coupling part and is disposed at the other end of the outer cover in the longitudinal direction, wherein the coil case is pressed on one side of the longitudinal direction by elastically supporting the first end cover by the elastic part so as to contact the hydraulic control block.

In the electronic control device according to an exemplary embodiment of the present disclosure, the elastic part may be provided in plurality.

In the electronic control device according to an exemplary embodiment of the present disclosure, at least one of the plurality of elastic parts may be in contact with the first end cover in a range of 0 to 180 degrees along the circumferential direction from one side surface of the body of the bobbin in the longitudinal direction, and at least one of the remaining elastic parts may be in contact with the first end cover in a range of 180 to 360 degrees along the circumferential direction from one side surface of the body of the bobbin in the longitudinal direction.

In the electronic control device according to an exemplary embodiment of the present disclosure, at least one pair of elastic parts among the plurality of elastic parts may be disposed symmetrically with each other.

In the electronic control device according to an exemplary embodiment of the present disclosure, the elastic part may include a flange part which extends radially outward from one side of the body of the bobbin in the longitudinal direction; an incision part which is formed in the flange part; and an extension part which extends from one side of the incision part to the inside of the incision part, wherein heat generated in the coil is discharged to a space between the incision part and the extension part, and transferred to the hydraulic control block.

In the electronic control device according to an exemplary embodiment of the present disclosure, the extension end of the extension part may be formed as a free end.

In the electronic control device according to an exemplary embodiment of the present disclosure, the incision part may be formed along a circumferential direction, and the extension part has a predetermined curvature.

In the electronic control device according to an exemplary embodiment of the present disclosure, the distance between the edge of the incision part and the extension part may be formed to be constant.

In the electronic control device according to an exemplary embodiment of the present disclosure, the elastic part may further include a protrusion which protrudes from the outer surface of the extension part and contacts the first end cover.

In the electronic control device according to an exemplary embodiment of the present disclosure, at least a portion of the extension part may be bent toward the first end cover to contact the first end cover.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
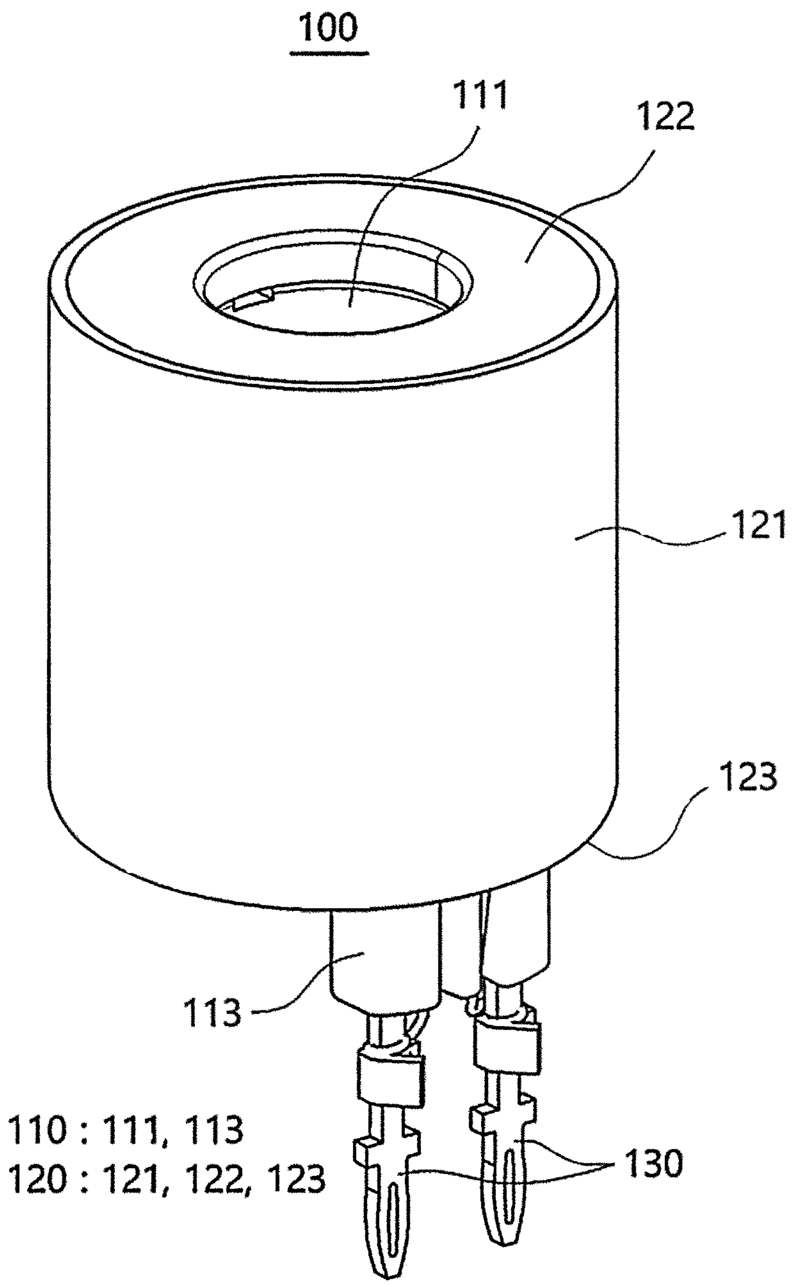
FIG. 1 is a perspective view of a coil assembly according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Figure 2:
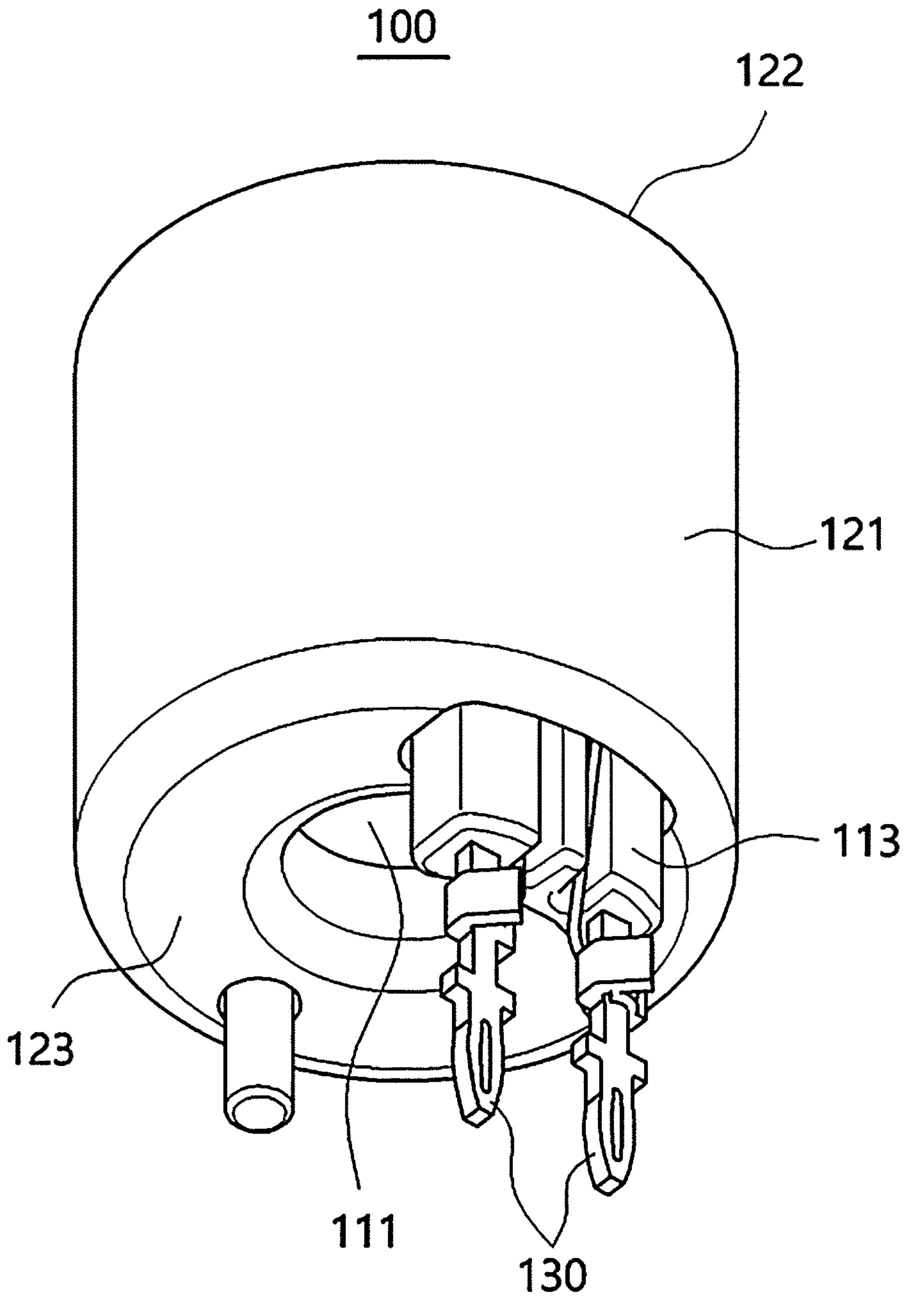
FIG. 2 is a perspective view showing a coil assembly according to an exemplary embodiment of the present disclosure from another direction.

FIG. 1 is a perspective view of a coil assembly according to an exemplary embodiment of the present disclosure, and FIG. 2 is a perspective view showing a coil assembly according to an exemplary embodiment of the present disclosure from another direction. In addition, FIG. 3 is a view showing the coil case transparently in FIG. 1.

The coil assembly 100 according to an exemplary embodiment of the present disclosure may be used for the solenoid valve of a brake electronic control unit such as an anti-lock brake system (ABS) electric control unit (ECU), an electronic stability control system (ESC) ECU or the like. In addition, the coil assembly 100 according to an exemplary embodiment of the present disclosure may be used in control circuits of various electronic control devices.

Figure 3:
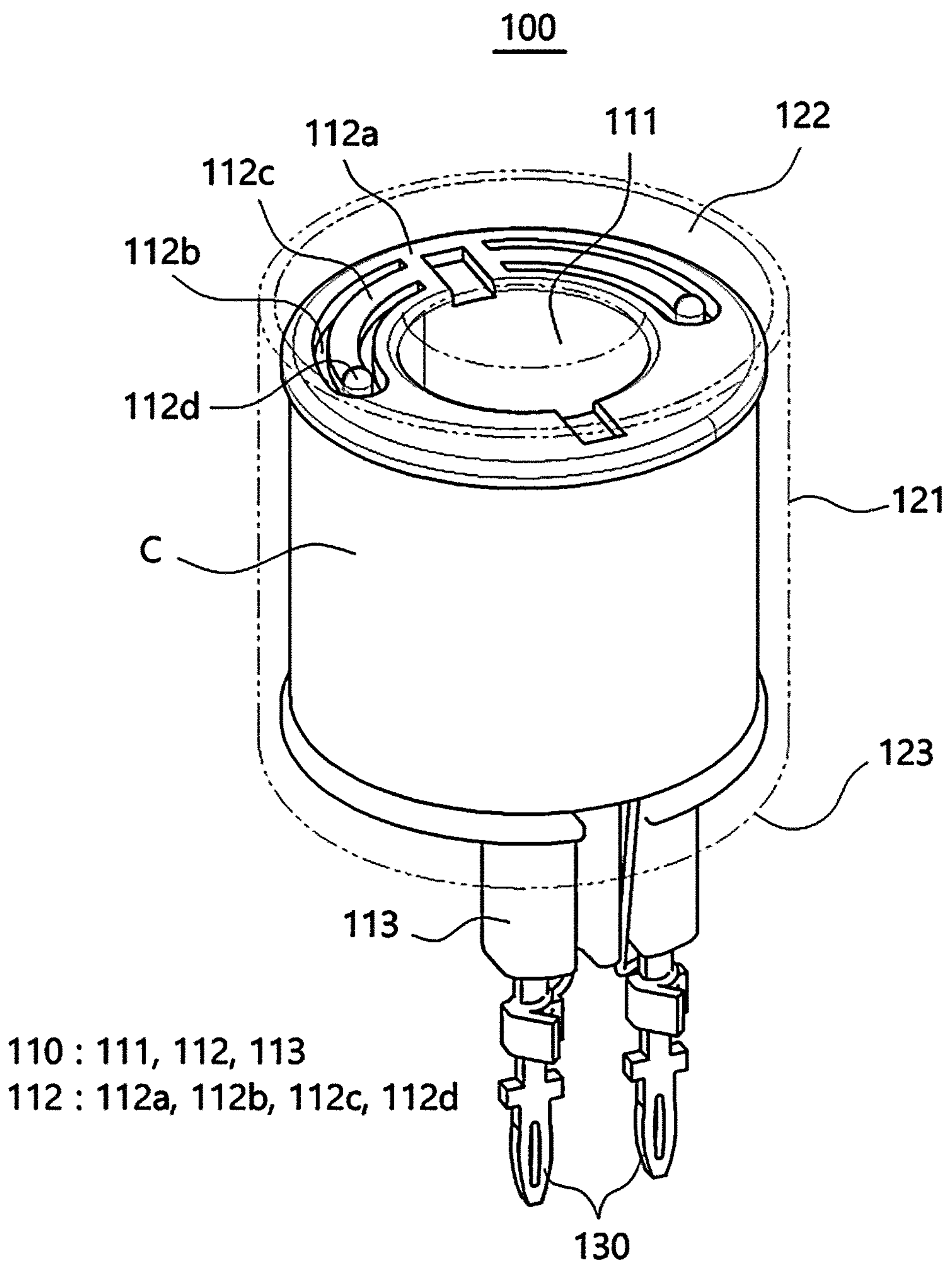
FIG. 3 is a view showing the coil case transparently in FIG. 1.

Referring to FIGS. 1 to 3, the coil assembly 100 according to an exemplary embodiment of the present disclosure includes a bobbin 110 and a coil case 120. The coil assembly 100 according to an exemplary embodiment of the present disclosure provides a structure in which the bobbin 110 elastically supports the coil case 120 to one side of the longitudinal direction.

A coil C is wound around the bobbin 110. The bobbin 110 includes a cylindrical body 111 around which the coil C is wound, an elastic part 112 which is provided on one side of the body 111 in the longitudinal direction, and a lead pin coupling part 113 which extends from the other side of the body 111 in the longitudinal direction to the other side of the longitudinal direction. The coil C is wound around the body 111 of the bobbin 110, and the lead pin 130 which is connected to the coil C is coupled to the lead pin coupling part 113. The coil C may be electrically connected to the outside by being connected to one or more lead pins 130 that are coupled to the lead pin coupling part 113 of the bobbin 110.

The coil case 120 has a cylindrical outer cover 121 which surrounds the outer peripheral surface of the body 111, a first end cover 122 which is disposed at one end of the outer cover 121 in the longitudinal direction so as to contact the elastic part 112, and a second end cover 123 which protrudes through the lead pin coupling part 113 and is disposed at the other end of the outer cover 121 in the longitudinal direction. The coil case 120 is elastically supported on one side of the longitudinal direction by the elastic part 112 of the bobbin 110.

In an exemplary embodiment of the present disclosure, the outer cover 121 and the second end cover 123 of the coil case 120 may be integrally provided, and the first end cover 122 may be provided separately from the outer cover 121. According to this configuration, in a state where the first end cover 122 is not coupled to the outer cover 121, the coil assembly 100 may be assembled in such a way that the bobbin 110 is inserted into the coil case 120, and the first end cover 122 is coupled.

In an exemplary embodiment of the present disclosure, the coil case 120 is pressed to one side of the longitudinal direction as the first end cover 122 is elastically supported by the elastic part 112. In other words, the elastic part 112 of the bobbin 110 presses and supports the first end cover 122 of the coil case 120 to one side of the longitudinal direction.

A plurality of elastic parts 112 may be provided. In an exemplary embodiment of the present disclosure, at least one of the plurality of elastic parts 112 may be in contact with the first end cover 122 in a range of 0 to 180 degrees along the circumferential direction from one side of the body 111 of the bobbin 110 in the longitudinal direction. In addition, at least one of the remaining elastic parts 112 may be in contact with the first end cover 122 in a range of 180 to 360 degrees along the circumferential direction from one side of the body 111 of the bobbin 110 in the longitudinal direction.

In addition, at least one pair of elastic parts 112 among the plurality of elastic parts 112 may be disposed symmetrically with each other. For example, the pair of elastic parts 112 may contact the first end cover 122 at positions that are 180 degrees apart from each other along the circumferential direction on one side of the body 111 of the bobbin 110 in the longitudinal direction, respectively.

In this way, since the plurality of elastic parts 112 are provided and a plurality of points of action are provided for the first end cover 122 of the coil case 120, the coil case 120 may be elastically supported stably. Preferably, when the plurality of elastic parts 112 are symmetrically arranged to provide a plurality of symmetrical points of action to the first cover 122 of the coil case 120, the stability of the elastic support may be maximized.

Figure 4:
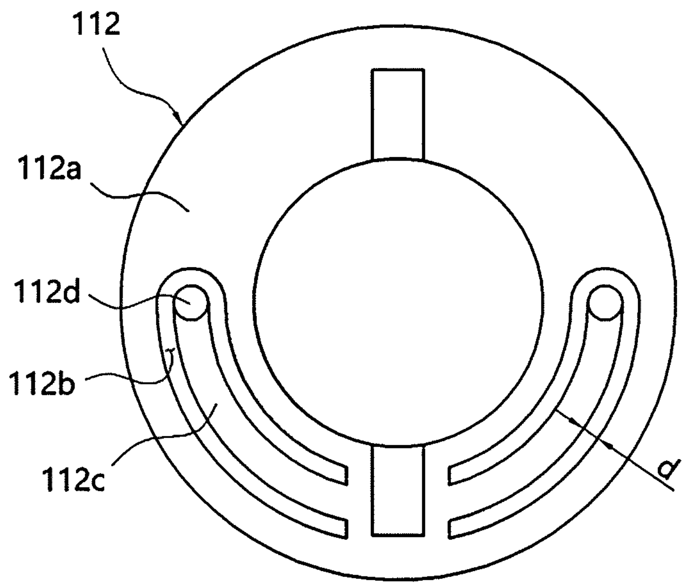
FIG. 4 is a plan view of the elastic part of a bobbin of a coil assembly according to an exemplary embodiment of the present disclosure.
Figure 5:
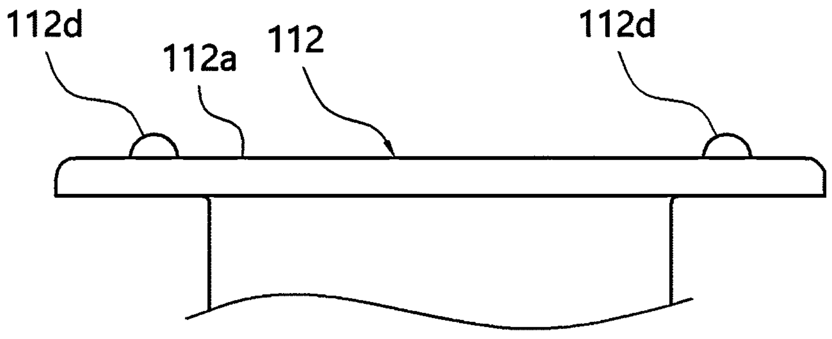
FIG. 5 is a side view of the elastic part of a bobbin of a coil assembly according to an exemplary embodiment of the present disclosure.

FIG. 4 is a plan view of the elastic part of a bobbin of a coil assembly according to an exemplary embodiment of the present disclosure, and FIG. 5 is a side view of the elastic part of a bobbin of a coil assembly according to an exemplary embodiment of the present disclosure. In addition, FIG. 6 is a cross-sectional view of a coil assembly according to an exemplary embodiment of the present disclosure.

Figure 6:
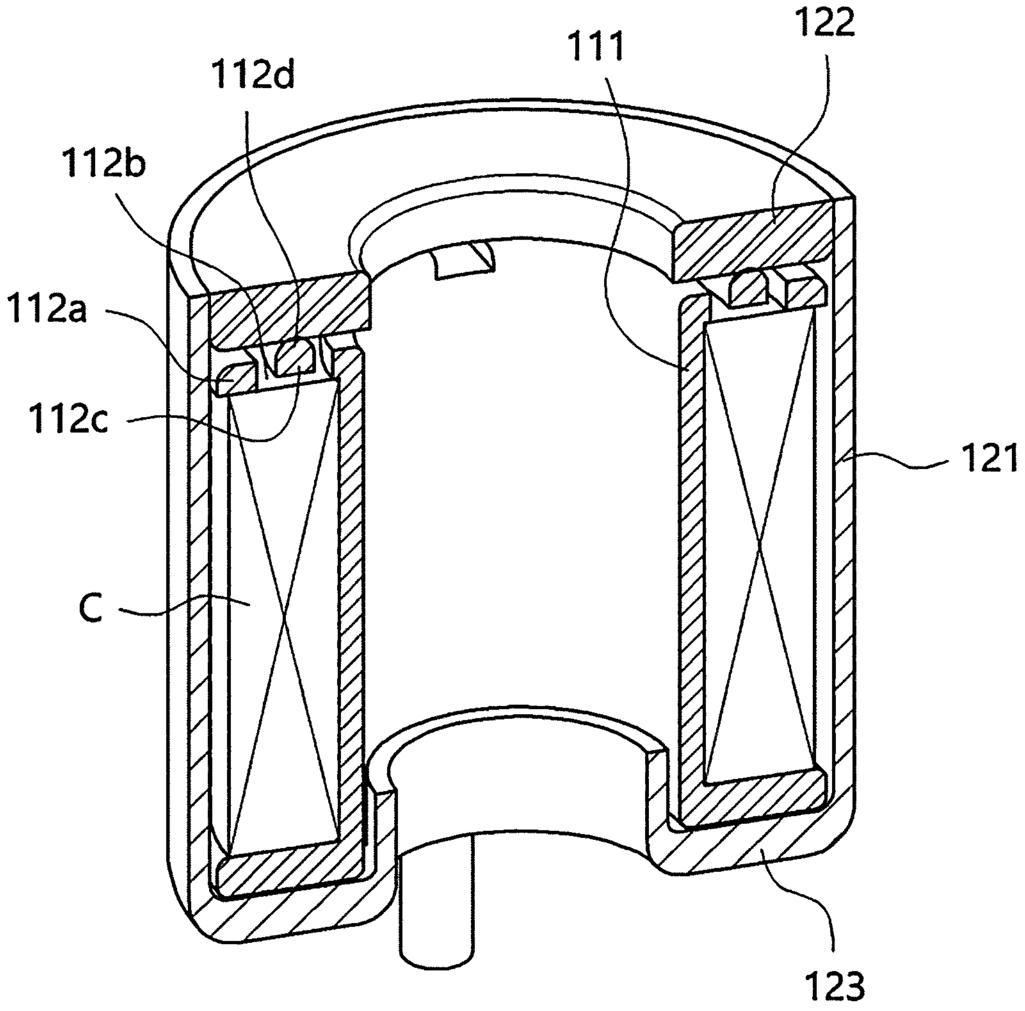
FIG. 6 is a cross-sectional view of a coil assembly according to an exemplary embodiment of the present disclosure.

Referring to FIGS. 4 to 6, in an exemplary embodiment of the present disclosure, the elastic part 112 may include a flange part 112*a* which extends outward in the radial direction from one side of the body 111 of the bobbin 110 in the longitudinal direction, an incision part 112*b* which is formed in the flange part 112*a*, and an extension part 112*c* which extends from one side of the incision part 112*b* to the inside of the incision part 112*b*. In this case, the extension end of the extension part 112*c* may be formed as a free end. Accordingly, the extension end of the extension part 112*c* may elastically move inside the incision part 112*b* and provide a supporting force to the first end cover 122 of the coil case 120.

Meanwhile, the extension end of the extension part 112*c* may be formed in an arc shape. When the extension part 112*c* comes into contact with the first end cover 122 and elastically supports the first end cover 122, the most stress can be applied to the extension end of the extension part 112*c*, and when the extension end of the extension part 112*c* is formed in an arc shape, stress may be effectively distributed, and accordingly, the durability of the extension 112*c* may be increased.

In addition, the incision part 112*b* may be formed along the circumferential direction, and the extension part 112*c* may have a predetermined curvature. In other words, the incision part 112*b* and the extension part 112*c* may be formed in an arc shape. In this case, the center of curvature of the extension part 112*c* may be located on a central axis of the body 111 of the bobbin 110 in the longitudinal direction. When the incision part 112*b* and the extension part 112*c* are configured in this way, it is possible to effectively secure the length of the extension part 112*c* that supports the first end cover 122, and through this, the elastic supporting force of the extension part 112*c* may be provided at a certain level or higher.

In the coil assembly 100 according to an exemplary embodiment of the present disclosure, the elastic part 112 further includes a protrusion 112*d* which protrudes from an outer surface of the extension part 112*c* and contacts the first end cover 122. That is, the elastic part 112 has a protrusion 112*d* that protrudes toward the first end cover 122 from the extension part 112*c*, and the protrusion 112*d* provides an action point and contacts the first end cover 122 such that the extension part 112*c* may transmit an elastic supporting force to the first end cover 122.

Meanwhile, in an exemplary embodiment of the present disclosure, the bobbin 110 is made of an insulating material. For example, the bobbin 110 may be made of a polyamide (PA) material. In addition, the coil case 120 may be made of a steel material. Accordingly, the bobbin 110 has a low heat transfer rate, and it is difficult for heat generated in the coil C to be smoothly transferred to the side of the coil case 120. In this situation, the gap between the edge of the incision part 112*b* and the extension part 112*c* becomes a path through which heat generated from the coil C wound around the bobbin 110 can be released. In other words, the incision part 112*b* of the elastic part 112 of the coil assembly 100 according to an exemplary embodiment of the present disclosure improves the heat dissipation performance of the coil assembly 100.

In this regard, referring to FIG. 4, in an exemplary embodiment of the present disclosure, the distance d between the corner of the incision part 112*b* and the extension part 112*c* may be formed to be constant. When the distance d between the edge of the incision part 112*b* and the extension part 112*c* is formed to be constant, a gap through which heat can be discharged can be uniformly provided along the circumferential direction, and as a result, it is possible to effectively achieve heat dissipation.

Figure 7:
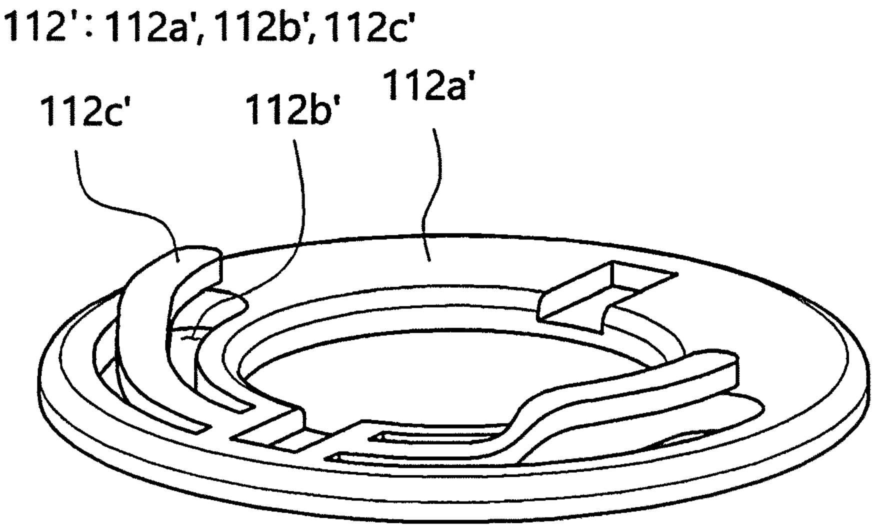
FIG. 7 is a perspective view of the elastic part of a coil assembly according to a modified example of an exemplary embodiment of the present disclosure.

FIG. 7 is a perspective view of the elastic part of a coil assembly according to a modified example of an exemplary embodiment of the present disclosure.

Referring to FIG. 7, in a modified example of an exemplary embodiment of the present disclosure, the elastic part 112' is partially modified compared to the exemplary embodiment of the present disclosure. Except for the elastic part 112', the rest of the configuration is the same as described above.

In a modified example of an exemplary embodiment of the present disclosure, the elastic part 112' includes a flange part 112*a*' which extends outward in the radial direction from one side of the body 111 of the bobbin 110 in the longitudinal direction, an incision part 112*b*' which is formed in the flange part 112*a*', and an extension part 112*c*' which extends from one side of the incision part 112*b*' to the inside of the incision part 112*b*', and has a form in which the extension part 112*c*' is bent. More specifically, at least a portion of the extension portion 112' may be bent toward the first end cover 122 to contact the first end cover 122.

In this case, the extension end of the extension part 112*c*' may contact the first end cover 122. In other words, the extension part 112*c*' may have a shape that is bent such that the extension end comes into contact with the first end cover 122. According to this modified example of an exemplary embodiment of the present disclosure, the contact area between the extension part 112*c*' and the first end cover 122 may be increased, and it is possible to provide more stable elastic support.

Figure 8:
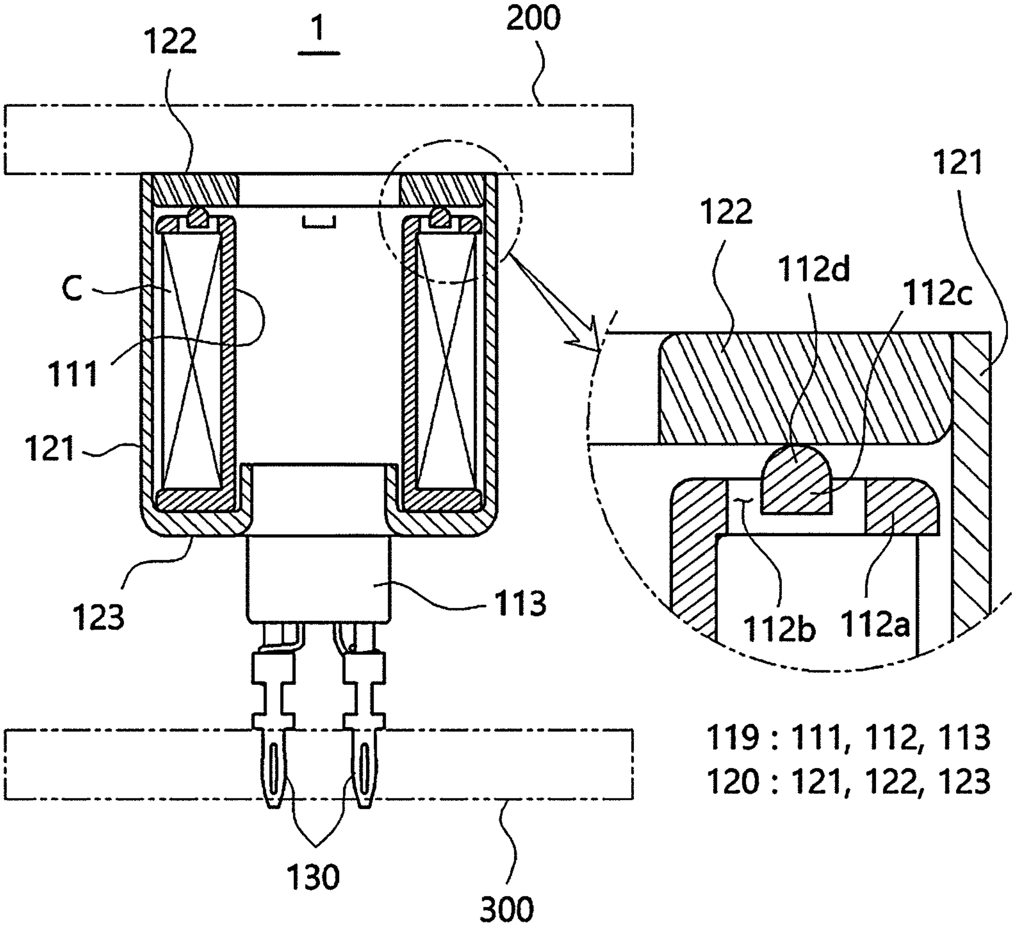
FIG. 8 is a configuration diagram of an electronic control de rice according to an exemplary embodiment of the present disclosure.

FIG. 8 is a configuration diagram of an electronic control device according to an exemplary embodiment of the present disclosure.

Referring to FIG. 8, the electronic control device 1 according to an exemplary embodiment of the present disclosure includes a coil assembly 100, a hydraulic control block 200 which is disposed on one side of the coil assembly 100 in the longitudinal direction, and a circuit board 300 which is disposed to be spaced apart from the other side of the coil assembly 100 in the longitudinal direction and is electrically connected to the coil assembly 100 by a lead pin 130. For example, the electronic control device 1 according to an exemplary embodiment of the present disclosure may be applied to an electronically controlled brake system.

The coil assembly 100 is as the same described above. That is, the coil assembly 100 includes a bobbin 110 and a coil case 120. In addition, the bobbin 110 includes a cylindrical body 111 around which the coil C is wound, an elastic part 112 which is provided on one side of the body 111 in the longitudinal direction, and a lead pin coupling part 113 which extends from the other side of the body 111 in the longitudinal direction to the other side of the longitudinal direction. In addition, the coil case 120 has a cylindrical outer cover 121 which surrounds the outer peripheral surface of the body 111, a first end cover 122 which is disposed at one end of the outer cover 121 in the longitudinal direction so as to contact the elastic part 112, and a second end cover 123 which protrudes through the lead pin coupling part 113 and is disposed at the other end of the outer cover 121 in the longitudinal direction. In the coil case 120, the first end cover 122 is elastically supported by the elastic part 112 such that the coil case 120 is pressed to one side of the longitudinal direction and may contact the hydraulic control block 200.

A plurality of elastic parts 112 may be provided. In an exemplary embodiment of the present disclosure, at least one of the plurality of elastic parts 112 may be in contact with the first end cover 122 in a range of 0 to 180 degrees along the circumferential direction from one side of the body 111 of the bobbin 110 in the longitudinal direction. In addition, at least one of the remaining elastic parts 112 may be in contact with the first end cover 122 in a range of 180 to 360 degrees along the circumferential direction from one side of the body 111 of the bobbin 110 in the longitudinal direction.

In addition, at least one pair of elastic parts 112 among the plurality of elastic parts 112 may be disposed symmetrically with each other. For example, the pair of elastic parts 112 may contact the first end cover 122 at positions that are 180 degrees apart from each other along the circumferential direction on one side of the body 111 of the bobbin 110 in the longitudinal direction, respectively.

As reviewed by referring to FIGS. 4 to 6, the elastic part 112 may include a flange part 112*a* which extends outward in the radial direction from one side of the body 111 of the bobbin 110 in the longitudinal direction, an incision part 112*b* which is formed in the flange part 112*a*, and an extension part 112*c* which extends from one side of the incision part 112*b* to the inside of the incision part 112*b*. In this case, the extension end of the extension part 112*c* may be formed as a free end.

Meanwhile, the extension end of the extension part 112*c* may be formed in an arc shape. In addition, the incision part 112*b* may be formed along the circumferential direction, and the extension part 112*c* may have a predetermined curvature. In other words, the incision part 112*b* and the extension part 112*c* may be formed in an arc shape.

In addition, the elastic part 112 further includes a protrusion 112*d* which protrudes from an outer surface of the extension part 112*c* and contacts the first end cover 122. That is, the elastic part 112 has a protrusion 112*d* that protrudes toward the first end cover 122 from the extension part 112*c*, and the protrusion 112*d* provides an action point and contacts the first end cover 122 such that the extension part 112*c* may transmit an elastic supporting force to the first end cover 122.

In addition, the above-described contents in relation to the coil assembly 100 according to an exemplary embodiment of the present disclosure may be applied to the electronic control device 1 according to an exemplary embodiment of the present disclosure. In addition, as shown in FIG. 7, it is also possible to apply the modified elastic part 112' to the electronic control device 1.

The hydraulic control block 200 includes a valve assembly (not illustrated) that opens and closes a flow path by an electric field formed in the coil assembly 100. The hydraulic control block 200 is disposed on one side of the coil assembly 100 in the longitudinal direction. For example, the hydraulic control block 200 may be made of a metal material. More specifically, the hydraulic control block 200 may be made of aluminum.

The circuit board 300 is disposed to be spaced apart from the other side of the coil assembly 100 in the longitudinal direction. The circuit board 300 is electrically connected to the coil assembly 100 by lead pins 130 such that current can be applied to the coil C.

Considering the ease of fastening between the coil assembly 100 and the valve assembly of the hydraulic control block 200, the coil case 120 preferably has a flow relative to the bobbin 110. On the other hand, after the coil assembly 100 and the hydraulic control block 200 are fastened, it is advantageous in terms of magnetic force performance and heat dissipation that the coil case 120 is in close contact with the hydraulic control block 200. According to the present disclosure, the elastic part 112 of the coil assembly 100 allows the flow of the coil case 120 during the fastening process between the coil assembly 100 and the valve assembly of the hydraulic control block 200, and after the fastening between the valve assembly 100 and the hydraulic control block 200 is completed, the coil case 120 is pressed toward the hydraulic control block 200. As a result, according to the present disclosure, it is possible to improve magnetic force performance and heat dissipation performance without deterioration in assemblability.

Meanwhile, in an exemplary embodiment of the present disclosure, the bobbin 110 is made of an insulating material. For example, the bobbin 110 may be made of a polyamide (PA) material. In addition, the coil case 120 may be made of a steel material. Accordingly, the bobbin 110 has a low heat transfer rate, and it is difficult for heat generated in the coil C to be smoothly transferred to the side of the coil case 120. In this situation, the gap between the edge of the incision part 112*b* and the extension part 112*c* becomes a path through which heat generated from the coil C wound around the bobbin 110 can be released. In other words, the incision part 112*b* of the elastic part 112 of the coil assembly 100 according to an exemplary embodiment of the present disclosure improves the heat dissipation performance of the coil assembly 100. As described above, the distance d between the edge of the incision part 112*b* and the extension part 112*c* may be formed to be constant.

According to the configuration described above, the coil assembly according to the present disclosure and the electronic control device including the same allows to omit a separate elastic structure for externally pressurizing a coil assembly in the electronic control device including the coil assembly through a structure in which the coil case of the coil assembly is pressed to one side by the elasticity provided from the inside, and improves manufacturing efficiency.

The coil assembly according to an exemplary embodiment of the present disclosure and the electronic control device including the same improve heat dissipation performance through a structure in which heat generated from a coil that is wound on a bobbin is transferred to the side of a coil case through an incision part formed in an elastic part of the bobbin.

It should be understood that the effects of the present disclosure are not limited to the above-described effects and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A coil assembly, comprising:

a bobbin having a cylindrical body around which a coil is wound, an elastic part which is provided on one side of the body in the longitudinal direction, and a lead pin coupling part which extends from the other side of the body in the longitudinal direction to the other side of the longitudinal direction; and a coil case having a cylindrical outer cover which surrounds the outer peripheral surface of the body, a first end cover which is disposed at one end of the outer cover in the longitudinal direction so as to contact the elastic part and a second end cover which protrudes through the lead pin coupling part and is disposed at the other end of the outer cover in the longitudinal direction, wherein the coil case is pressed on one side of the longitudinal direction by elastically supporting the first end cover by the elastic part.

2. The coil assembly of claim 1, wherein the elastic part is provided in plurality.

3. The coil assembly of claim 2, wherein at least one of the plurality of elastic parts is in contact with the first end cover in a range of 0 to 180 degrees along the circumferential direction from one side of the body of the bobbin in the longitudinal direction, and at least one of the remaining elastic parts is in contact with the first end cover in a range of 180 to 360 degrees along the circumferential direction from one side of the body of the bobbin in the longitudinal direction.

4. The coil assembly of claim 2, wherein at least one pair of elastic parts among the plurality of elastic parts are disposed symmetrically with each other.

5. The coil assembly of claim 4, wherein the pair of elastic parts are in contact with the first end cover, respectively, at positions that are 180 degrees apart from each other along the circumferential direction on one side of the body of the bobbin in the longitudinal direction.

6. The coil assembly of claim 1, wherein the elastic part comprises:

a flange part which extends radially outward from one side of the body of the bobbin in the longitudinal direction;

an incision part which is formed in the flange part; and an extension part which extends from one side of the incision part to the inside of the incision part.

7. The coil assembly of claim 6, wherein the extension end of the extension part is formed as a free end.

8. The coil assembly of claim 7, wherein the extension end of the extension is formed in an arc shape.

9. The coil assembly of claim 6, wherein the incision part is formed along a circumferential direction, and the extension part has a predetermined curvature.

10. The coil assembly of claim 9, wherein the center of curvature of the extension part is located on a central axis of the body of the bobbin in the longitudinal direction.

11. The coil assembly of claim 6, wherein the distance between the edge of the incision part and the extension part is formed to be constant.

12. The coil assembly of claim 6, wherein the elastic part further comprises a protrusion which protrudes from the outer surface of the extension part and contacts the first end cover.

13. The coil assembly of claim 6, wherein at least a portion of the extension part is bent toward the first end cover to contact the first end cover.

14. An electronic control device, comprising:

a coil assembly;

a hydraulic control block which is on one side of the coil assembly in the longitudinal direction; and a circuit board which is disposed to be spaced apart from the other side of the coil assembly in the longitudinal direction and electrically connected to the coil assembly by lead pins;

wherein the coil assembly comprises:

a bobbin having a cylindrical body around which a coil is wound, an elastic part which is provided on one side of the body in the longitudinal direction, and a lead pin coupling part which extends from the other side of the body in the longitudinal direction to the other side of the longitudinal direction; and a coil case having a cylindrical outer cover which surrounds the outer peripheral surface of the body, a first end cover which is disposed at one end of the outer cover in the longitudinal direction so as to contact the elastic part and a second end cover which protrudes through the lead pin coupling part and is disposed at the other end of the outer cover in the longitudinal direction, wherein the coil case is pressed on one side of the longitudinal direction by elastically supporting the first end cover by the elastic part so as to contact the hydraulic control block.

15. The electronic control device of claim 14, wherein the elastic part is provided in plurality.

16. The electronic control device of claim 15, wherein at least one of the plurality of elastic parts is in contact with the first end cover in a range of 0 to 180 degrees along the circumferential direction from one side surface of the body of the bobbin in the longitudinal direction, and at least one of the remaining elastic parts is in contact with the first end cover in a range of 180 to 360 degrees along the circumferential direction from one side surface of the body of the bobbin in the longitudinal direction.

17. The electronic control device of claim 15, wherein at least one pair of elastic parts among the plurality of elastic parts are disposed symmetrically with each other.

18. The electronic control device of claim 16, wherein the elastic part comprises:

a flange part which extends radially outward from one side of the body of the bobbin in the longitudinal direction;

an incision part which is formed in the flange part; and an extension part which extends from one side of the incision part to the inside of the incision part, wherein heat generated in the coil is discharged to a space between the incision part and the extension part, and transferred to the hydraulic control block.

19. The electronic control device of claim 18, wherein the elastic part further comprises a protrusion which protrudes from the outer surface of the extension part and contacts the first end cover.

20. The electronic control device of claim 18, wherein at least a portion of the extension part is bent toward the first end cover to contact the first end cover.

* * * * *